United States Patent [19]

Rud, Jr.

[11] 4,389,895
[45] Jun. 28, 1983

[54] CAPACITANCE PRESSURE SENSOR

[75] Inventor: Stanley E. Rud, Jr., Eden Prairie, Minn.

[73] Assignee: Rosemount Inc., Eden Prairie, Minn.

[21] Appl. No.: 287,307

[22] Filed: Jul. 27, 1981

[51] Int. Cl.³ .............................................. G01L 9/12
[52] U.S. Cl. .................................... 73/724; 73/718; 361/283
[58] Field of Search ................... 73/724, 718; 361/283

[56] References Cited

U.S. PATENT DOCUMENTS

| 3,962,921 | 6/1976 | Lips | 73/398 |
| 4,084,438 | 4/1978 | Lee et al. | 73/706 |
| 4,120,206 | 10/1978 | Rud | 73/718 |
| 4,340,409 | 7/1982 | Brooks | 73/724 |
| 4,345,299 | 8/1982 | Ho | 73/724 |

FOREIGN PATENT DOCUMENTS 2021479 11/1971 Fed. Rep. of Germany .

Primary Examiner—Donald O. Woodiel
Attorney, Agent, or Firm—Kinney, Lange, Braddock, Westman and Fairbairn

[57] ABSTRACT

A capacitive pressure sensor has a diaphragm means a portion of which is conductive which forms a first capacitor electrode. The sensor also has a reference disc means a portion of which is conductive which forms a second capacitive electrode. The diaphragm means and the reference disc means are supported in a spaced, over-lying relationship to each other by a peripheral spacer means. Responsive to pressure, the diaphragm means deflects relative to the reference disc means thus changing the capacitive spacing of the diaphragm means and the reference disc means. The diaphragm means, reference disc means and spacer means are formed from substantially the same material. The spacer means is disposed between the diaphragm means and the reference disc means adjacent their outer edges and the diaphragm means, reference disc means and spacer means are then fused together.

19 Claims, 5 Drawing Figures

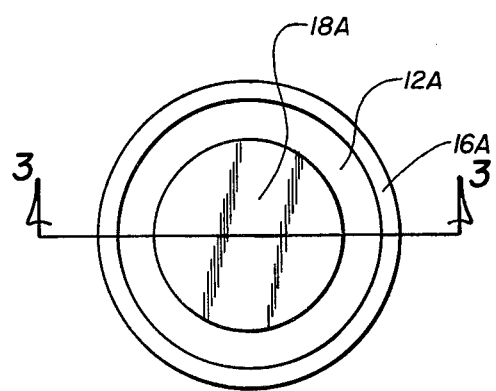
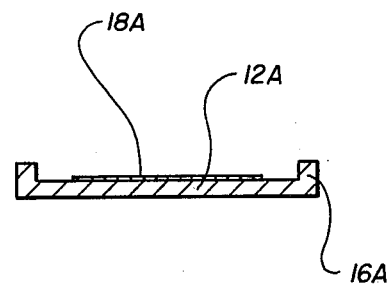
FIG. 2    FIG. 3
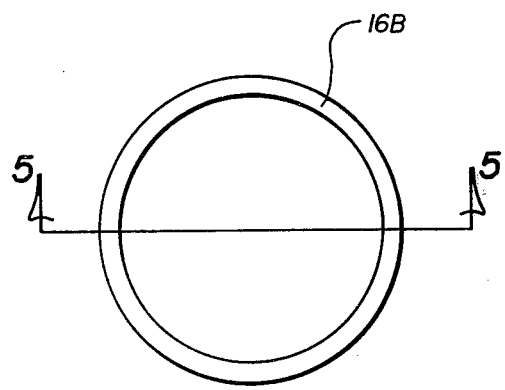
FIG. 4    FIG. 5

CAPACITANCE PRESSURE SENSOR

BACKGROUND OF THE INVENTION

1. Field of the Invention

This invention relates to an improved apparatus for capacitive pressure sensing devices.

2. Prior Art

There are many capacitive pressure sensing devices in the prior art. These devices are manufactured from various materials and in various ways. The capabilities of such devices generally are limited by the known methods and devices.

For example, construction of the sensing diaphragm from an electrically non-conductive material such as quartz has known advantages as described, for example, in German Offenlegungschrift No. 2021479. U.S. Pat. No. 3,962,921 shows a pressure sensitive capacitive construction using two diaphragms 36 and 38, however, these diaphragms are "secured by bonding" but no method of bonding is taught. U.S. Pat. No. 4,084,438 teaches a method of bonding diaphragms or discs by having the discs "peripherally bounded by a predetermined curve" establishing a "predetermined gap" with "a plurality of shims . . .". The '438 specification states: "Then the discs are pressed together and fused by applying heat and pressure at localized regions near those spaced points. Then the shims are removed and the remaining points on the peripheral boundary are similarly fused by the application of heat and pressure at localized regions of the disc elements near the remaining peripheral points." Such construction causes internal stresses, which are acknowledged in the patent by the statements that "internal stress developed during the fusion process . . ." may be reduced by annealling. The present invention in a unique manner avoids this problem and provides several advantages which will be apparent to a skilled artisan from the disclosure.

SUMMARY OF THE INVENTION

In accord with the present invention, a pressure sensor for measuring a pressure includes diaphragm means which deflects under such pressure. The diaphragm means has a first side for the application of a first or reference pressure and a second side for the application of a second pressure. A portion of the diaphragm means, prefereably at least one of the sides, is conductive to form a first capacitor electrode. A reference disc means has a pressure passageway therethrough for pressure communication of the first or reference pressure to the diaphragm means. The reference disc means has a first disc side and a second disc side. A portion of the reference disc means, preferably at least one of the sides, the first disc side or the second disc side, is also conductive, thus forming a second or reference capacitor electrode. The reference disc means and the diaphragm means are spaced from each other by a spacer means which is formed from substantially the same material as the reference disc means and the diaphragm means. The spacer means preferably is a peripheral ring or rim disposed in a substantially uniform manner on at least one side of either the diaphragm means or the reference disc means. The diaphragm means and the reference means with the spacer means therebetween in a sandwich-like relationship are then fused together at the periphery thereof. The diaphragm means, the reference disc means and the spacer means are formed from electrically non-conductive material, but at least one of the first and second sides of the diaphragm means and at least one of the first and second disc sides of the reference disc means are treated or coated to be at least partially conductive and in a predetermined spaced relationship to form a capacitive pressure sensor. Preferably, a support block means is similarly fused to the reference disc means around its periphery. The support block means is used for supporting the capacitive sensor in a desired position and may also be used for mounting electrical components proximate to the sensor. Also, preferably, a housing having bulkheads for enclosing the apparatus is used and a suitable coupling means provides a pressure barrier to separate the fluids providing the first and the second pressure and to provide support from the housing to the support block means. In such embodiment, port means in the first end of the housing for coupling at least one of the first and the second pressure to the diaphragm is also provided.

The invention includes suitable dimensioning of the thickness of the diaphragm means and the reference disc means such that the difference in thickness compensates at least in part for the difference of acceleration induced deflection of the diaphragm means which is supported or clamped adjacent its edge on one side of the diaphragm means only, and the response of the reference disc means which is supported or clamped at its edge on both sides.

In yet a further embodiment, a temperature detection means is supported on at least one of the diaphragm means, the reference disc means or the support block means thus providing temperature compensation of the capacitance signal which is representative of pressure.

Fusing the periphery of the diaphragm means and the reference disc means with the spacer means therebetween and with the support block means avoids many of the disadvantages of prior art devices and provides several advantages which will be apparent from the following description.

BRIEF DESCRIPTION OF THE DRAWINGS

FIG. 2 is a top view of a diaphragm means or a reference disc means having a spacer means formed thereon.

FIG. 3 is a sectional representation taken along plane 3—3 of the embodiment of FIG. 2.

FIG. 4 is a top view of a spacer means of the invention.

FIG. 5 is a sectional representation taken along plane 5—5 of FIG. 4.

DESCRIPTION OF THE PREFERRED EMBODIMENT OF FIG. 1

Figure 1:
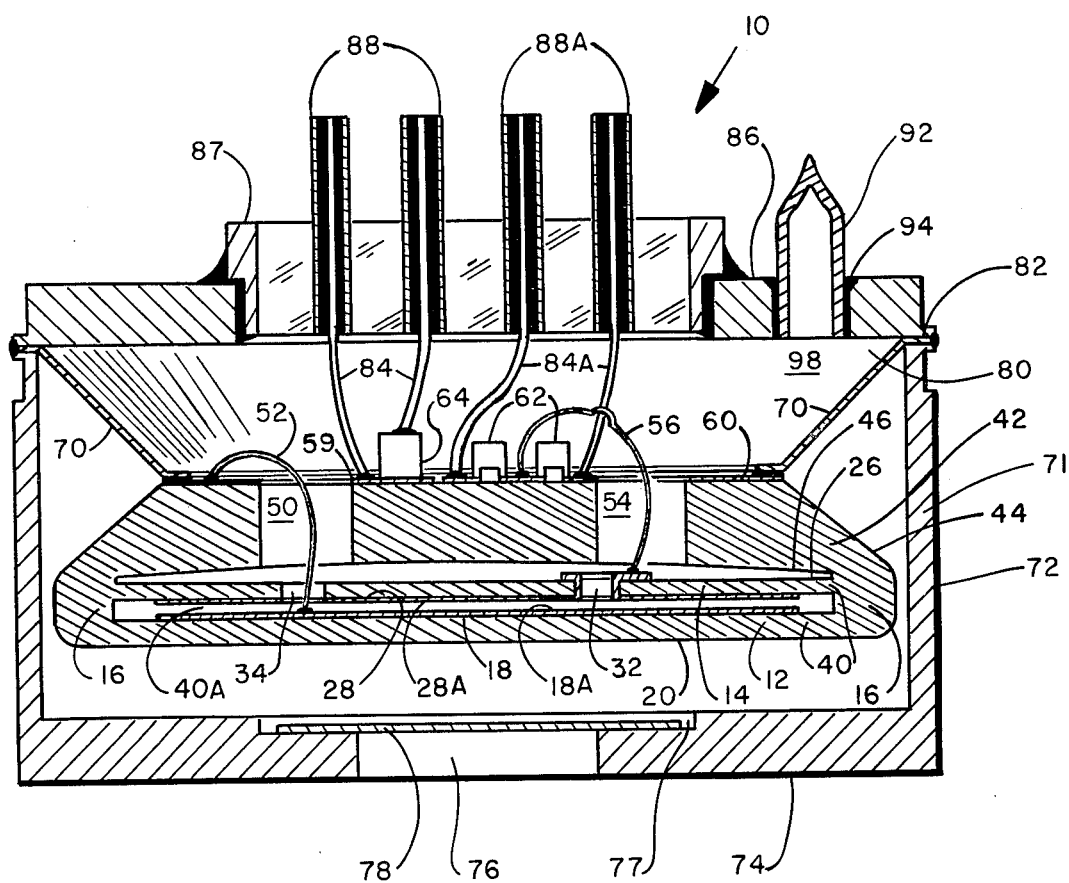
FIG. 1 is a sectional view of a preferred embodiment of a capacitance pressure sensor, the support block and a housing therefore made in accordance with the present invention.

FIG. 1 shows a transducer 10 which includes diaphragm means 12, a reference disc means 14 and spacer means 16. Spacer means 16 is perhaps best shown in FIGS. 2 and 3. Diaphragm means 12 preferably is formed from a flat, optically ground disc of a non-electrically conductive, low hysteresis spring property material. Reference disc means 14 preferably is formed in a similar manner. Diaphragm means 12 has a first side 18 and a second side 20. Preferably a pressure to be sensed is applied to second side 20 and a reference pressure or a pressure for a differential pressure measurement is applied to first side 18, but all pressure measurements such as gauge, absolute or differential may be made with modifications apparent to a skilled artisan. Reference disc means 14 has a first disc side 26 and a second disc side 28. Reference disc means 14 then preferably has a first bore 32 transverse to disc sides 26 and 28.

Preferably a conductive material such as chromium is deposited as by sputtering onto a central portion of at least one side (18,20) of diaphragm means 12 and at least one of the disc sides (26,28) of reference disc means 14. One preferred embodiment of conductive material is shown at 18A and 28A. When such conductive material is deposited on reference disc means 14, first bore 32 is plated through, thus providing a suitable electrical connection to the conductive material 28A of reference disc means 14.

Referring to FIG. 2 and FIG. 3 wherein the numbering is consistent with FIG. 1, except that a suffix "A" has been added thereto, at the periphery of either diaphragm means 12A (as shown) or reference disc means 14 which may be the same as diaphragm 12A as shown or both, spacer means 16A, which is formed from substantially the same material as diaphragm means 12 and reference disc means 14, is deposited, preferably by sputtering, vapor deposition, evaporation or other suitable process, using known depositing processes. Such depositing of the material is controlled to form a relative uniform layer of such material at a desired, substantially continuous thickness. Spacer means 16 may also be formed in diaphragm means 12 or reference disc means 14 as by etching, grinding, or machining the central portion thereof to form a ridge comprising spacer means 16A around the periphery thereof. A concave ground contour may also be used. When this method is used the electrically conductive material 18A, 28A is added after such machining. As shown in FIG. 4 and FIG. 5 wherein the numbering is consistent with the previous Figs. except that a suffix "B" has been added thereto, the spacer means may also be an annular ring 16B which is then disposed between diaphragm means 12 and reference disc means 14. Spacer means 16 can be of various suitable geometric shapes, but preferably, it provides a uniform continuous means of spacing diaphragm means 12 and reference disc means 14.

A second bore 34 transverse to sides 26 and 28 is then made in reference disc means 14. Second bore 34 is made so as not to be plated through as bore 32 was, hence, the surface defining second bore 34 is non-conductive and the bore provides a path for a suitable electrical connection to the conductive material 18A of first side 18 of diaphragm means 12. With spacer means 16 disposed between diaphragm means 12 and reference disc means 14, a suitable heat generator such as a torch or other heat generating means is applied to the periphery of diaphragm means 12, reference disc means 14 and spacer means 16 to fuse the three parts together thus forming capacitance sensor 40. Preferably such fusing is provided in a substantially uniform manner to avoid undesirable stress in capacitive sensor 40. Capacitive sensor 40 forms a cavity 40A which is fully enclosed by diaphragm means 12, reference disc means 14 and spacer 16 with the exception of first bore 32 and second bore 34.

When diaphragm means 12, reference disc means 14, and spacer means 16 are formed from fused silica, the peripheral temperature thereof is elevated above approximately 1600 degrees centigrade resulting in a capacitive sensor 40, formed of a homogenous, isotropic material. Other non-conductive, good spring property materials such as glass can be used. One advantage of this method of construction is that since the process does not require foreign material such as a glass "frit", "adhesive" or other bonding material for bonding diaphragm means 12 to reference disc means 14, the low hysteresis spring properties of the material are retained.

A further preferred embodiment of transducer 10 preferably includes a support block means 42 which preferably is formed from a massive disc of the same material as diaphragm means 12, reference disc means 14 and spacer means 16. Support block means 42 preferably is tapered or stepped about its periphery as shown at 44 and then contoured to be disposed on sensor 40. A first surface 46 is machined out, as by diamond grinding, so as to clear the central portion of first disc side 26 of reference disc means 14 and to mate with reference disc means 14 at their respective peripheries. A first bore 50 in support block means 42 is provided for a first electrical leadwire 52 from a surface 60 therethrough and through second bore 34 in reference disc means 14 to connect with electrically conductive material 18A on the first side 18 of diaphragm means 12. A second bore 54 in support block means 42 is provided for a second electrical leadwire 56 from a conductive path 59 therethrough to connect to electrically conductive material 28A on the first side 26 of the reference disc means 14. Support block means 42 is then fused to reference disc means 14 at the same time capacitive sensor 40 is fused. Bores 50 and 54 in support block means 42 and bores 32 and 34 in reference disc means 14 also serve to communicate a first pressure to first side 18 of diaphragm means 12.

In one embodiment, preferably diaphragm means 12 and reference disc means 14 have thicknesses D1 and RD1 respectively, where RD1 is less than D1 to compensate for the difference of the supporting structure of the reference disc means and the diaphragm means. The reference disc means 14 is fully supported or clamped at its periphery on both sides. Diaphragm means 12 and spacer means 16 at its periphery clamp one side of reference disc means 14 and support block means 42 clamps the other side. Diaphragm means 12 is supported or clamped at its periphery on only one side, by reference disc means 14, this results in different responses of diaphragm means 12 and reference disc means 14 to a transverse acceleration force, that is a force having a component normal to diaphragm means 12. Diaphragm means 12 typically deflects slightly more than a diaphragm supported or clamped on both sides, while reference disc means 14 responds as a fully clamped diaphragm. Therefore, the thickness of reference disc 14 can be adjusted to completely compensate any acceleration induced errors.

Circuit conductive paths 59 preferably are described on surface 60 of support block means 42 using known electronic fabricating techniques such as by etching and depositing. A suitable excitation and detection means 62 is preferably comprising at least a pair of diodes for electrical excitation of sensor 40 and for detection of the electrical signal from sensor 40 is coupled to the circuit conduction paths 59. Temperature detection means 64 preferably is coupled, as desired, to the circuit conduction paths 59. Temperature detection means 64 is used to sense the temperature of support block means 42 or of the diaphragm means 12 or reference disc means 14.

Since sensor 40 and support block means 42 are thermally coupled together through a substantially uniform material the temperature of support block means 42 is quite close to the temperature of sensor 40. Temperature detection means 64 is externally powered and provides an external output to compensate for temperature variation the sensed electrical signal responsive to the capacitance change due to pressure.

In one preferred embodiment of the invention, temperature detection means 64 is a thin or a thick film resistor which is deposited directly on support block means 42 and circuit conduction paths 59 are coupled to temperature detection means 64 as desired. Suitable external leadwires 84 are coupled to circuit conduction paths 59. Temperature detection means 64 may also be a thermister or other temperature sensing means. Leadwires 84 provide power to temperature detection means 64 and output an electrical signal representative of the sensed temperature.

In yet a further embodiment of the invention, temperature detection means 64 is deposited directly on at least one of the diaphragm means 12 or the reference disc means 14. Suitable leadwires are then coupled from temperature detection means 64 to the circuit conduction paths 59. Circuit conduction paths 59 are in turn coupled to suitable leadwires 84 which are externally terminated. Similarly, excitation and detection means 62 may be mounted on diaphragm means 12 or reference disc means 14 as desired.

An annular stress isolation mounting ring 70 is coupled to support block means 42 to mount sensor 40 and support block means 42 in a desired position without transmitting thermal expansion stresses from the high expansion metal case to the low expansion support block means material. Preferably mounting ring 70 is formed from a low expansion ductile material such as a nickel-iron alloy and coupled to a portion of circuit conduction paths 59 as by soldering, hence providing a readily accessible ground connection.

A housing 71 which preferably is cylindrical in shape preferably is formed from a pressure bearing material such as stainless steel. Preferably, housing 71 is formed of two parts, a cylindrical portion 72 closed at a first end 74, except for port means 76 provided for pressure communication to diaphragm means 12. The housing 71 is open at a second end 80. First end 74 may also have a suitable groove 77 for supporting a filter 78 over port means 76.

Mounting ring 70 is formed as at 82 to be disposed on cylindrical portion 72 with sensor 40 and support block means 42 attached thereto. Leadwires 84 and 84A pass through a plurality of insulated tubes such as 88 and 88A in a glass header 87 and each is then soldered in place. The solder then forms a pressure barrier. Leadwires 84 and 84A are connected to suitable external excitation and read out circuitry for both temperature detection means 64 and capacitance detection means 62 respectively.

Cover 86 forms the top of housing 71. Cover 86 is then disposed on portion 82 and then cover 86, mounting ring 70 and cylindrical portion 72 of mounting ring 70 are bonded together, preferably as by welding. A conventional pinch off tube 92 is brazed or welded in place in a bore 94 in cover 86. In one preferred embodiment then cover 86, mounting ring 70 and surface 60 of support block means 42 form a cavity 98. Cavity 98 preferably is then pressurized or evacuated as desired and pinch off tube 92 is pinched off to seal the cavity at a reference pressure or vacuum.

In one preferred embodiment of FIG. 1 just described, in operation, a pressure to be measured is applied through port means 76. Such pressure, whether liquid or gas, then causes diaphragm means 12 to deflect responsive to such pressure thus changing the spacing between reference disc means 14 and diaphragm means 12. Since at least one side of reference disc means 14 and at least one side of diaphragm means 12 have conduction material 18A, 28A disposed thereon thus forming an electrical capacitor, and since the spacing of the two electrical plates forming such capacitor is changed by the deflection of diaphragm means 12, a change in the electrical capacitance of sensor 40 occurs. This change in capacitance causes a change in the electrical signal flowing through leadwires 52 and 56, excitation and detection means 62 and leadwires 84A. Such electrical signal change is measured externally in a known manner.

Temperature transients applied to transducer 10 reach sensor 40 through port means 76 and through housing 71 and mounting ring 70. Both because of the structure shown and the fusing of like materials to form sensor 40 and further fusing to attach support block means 42 to sensor 40, transducer 10 components are symmetrically exposed to such transients, thus such transients have reduced effects on the capacitive signals representative of pressure. Mounting ring 70 provides the heat path from housing 71 to support block means 42 and sensor 40. Temperature detection means 64 is disposed on conductive path 59 of support block means 42 and due to the heat transfer characteristics of support block means 42, diaphragm means 12, reference disc means 14 and spacer means 16 the temperature sensed by temperature detection means 64 is representative of the temperature of sensor 40, hence suitable temperature compensation of the output capacitive signal can be performed in known manners.

Although the present invention has been described with reference to preferred embodiments, workers skilled in the art will recognize that changes may be made in form and detail without departing from the spirit and scope of the invention.

What I claim is:

1. Apparatus for measuring pressure comprising:
    diaphragm means for deflection under pressure having a first side for application of first pressure thereto, and a second side for application of a second pressure, wherein at least a portion of the diaphragm means is conductive thus forming a first capacitor electrode;
    reference disc means having a passageway therethrough for communicating the first pressure to one side of the diaphragm means and having a first disc side and a second disc side, wherein at least a portion of the reference disc means is conductive thus forming a reference capacitor electrode in electrical communication with the first capacitor electrode, and
    spacer means for supporting the diaphragm means adjacent its edges in a spaced relationship from the reference disc means,
    characterized in that the spacer means is formed from substantially the same material as the diaphragm means and the reference disc means and is disposed therebetween, and wherein the diaphragm means, the reference disc means and the spacer means are then fused together.

2. Apparatus according to claim 1 wherein the spacer means is deposited adjacent the periphery of at least one of the diaphragm means and the reference disc means.

3. Apparatus according to claim 2 wherein the spacer means is sputtered adjacent the periphery of at least one of the diaphragm means and the reference disc means.

4. Apparatus according to claim 2 wherein the spacer means is vapor deposited adjacent the periphery of at least one of the diaphragm means and the reference disc means.

5. Apparatus according to claim 2 wherein the spacer means is evaporatively deposited adjacent the periphery of at least one of the diaphragm means and the reference disc means.

6. Apparatus according to claim 1 wherein the spacer means is integrally formed adjacent the periphery of at least one of the diaphragm means or the reference disc means.

7. Apparatus according to claim 1 further comprising support block means fused to the reference disc means adjacent its periphery and having a bore for communicating the first pressure to the first side of the diaphragm means, and wherein the support block means provides support for the diaphragm means and the reference disc means.

8. Apparatus according to claim 7 further comprising:
a housing for enclosing the apparatus and having port means for communicating the second pressure to the second side to the diaphragm means; and
mounting ring means for attaching the support block means to the housing.

9. Apparatus according to claim 8 wherein the mounting ring means together with the housing provides a pressure barrier to separate the first and the second pressures.

10. Apparatus according to claim 7 wherein the diaphragm means and the reference disc means have a thickness D1 and RD1 respectively and wherein RD1 is less than D1.

11. Apparatus according to claim 10 wherein the thickness RD1 is related to thickness D1 to at least partially compensate the acceleration sensitivity differences resulting from supporting the edge of the diaphragm means relative to the support means on one side only while supporting the edge of the reference disc means on both sides thereof relative to the reference disc means.

12. Apparatus according to claim 7 wherein the diaphragm means, the reference disc means, the spacer means and the support means are formed from the same electrically non-conductive material.

13. Apparatus according to claim 8 wherein the dielectric material is selected from a group consisting of fused silica, glass, or other non-conductive good spring property material.

14. Apparatus according to claim 1 wherein the conductive portion of the diaphragm means and the conductive portion of the reference disc means are formed by depositing a conductive material on a portion of the electrically non-conductive material.

15. Apparatus according to claim 14 wherein the conductive material is deposited on a portion of the first side of the diaphragm means and on a portion of the second side of the reference disc means.

16. Apparatus according to claim 15 wherein the first bore in the reference disc means comprises a plated through hole for electrically coupling the conductive portion of the reference disc means to suitable circuitry.

17. Apparatus according to claim 16 wherein the support block means has circuit conduction paths deposited thereon and suitable leadwire means are coupled from such paths to the conductive material on the diaphragm means and the reference disc means respectively.

18. Apparatus according to claim 17 further comprising excitation and detection means supported on the support block means and electrically coupled to the diaphragm means and the reference disc means for exciting and detecting the signal from the diaphragm means and the reference disc means.

19. Apparatus according to claims 1, 7, or 17 wherein a temperature detection means is supported on at least one of the support block means, diaphragm means and reference disc means for sensing the temperature thereof.

* * * * *